Aug. 22, 1944.   K. J. LOWE   2,356,257
FIREARM
Filed Nov. 28, 1939   4 Sheets-Sheet 1
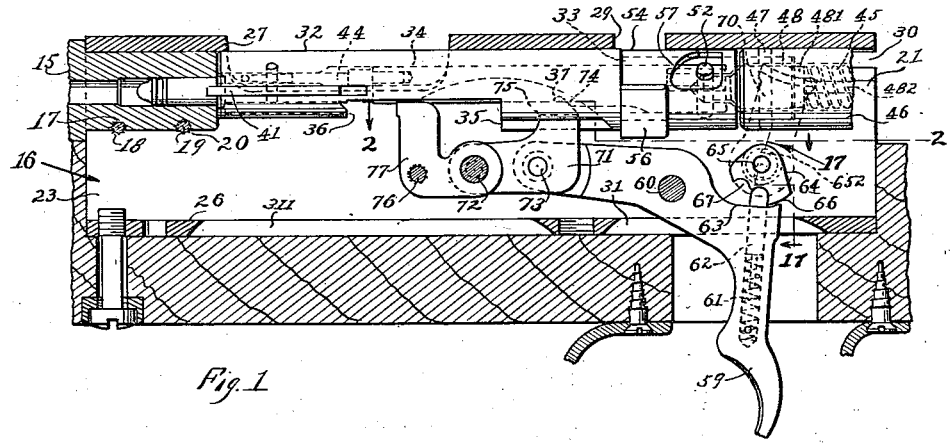
Fig. 1
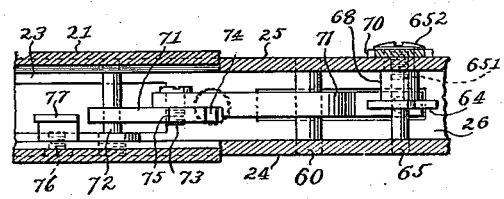
Fig. 2
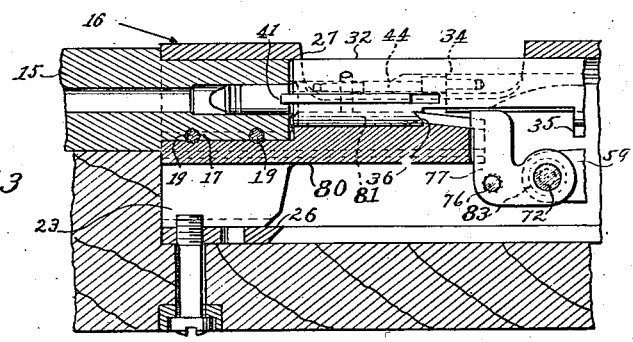
Fig. 3
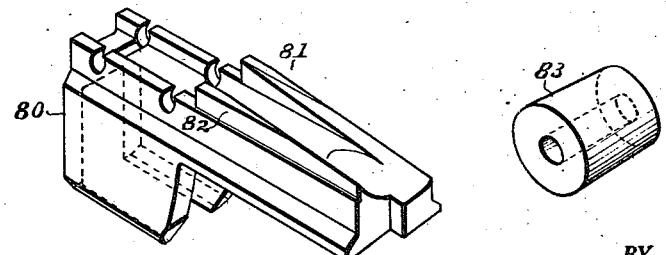
Fig. 4
Fig. 4 A
INVENTOR.
Kenneth J. Lowe
BY
ATTORNEY

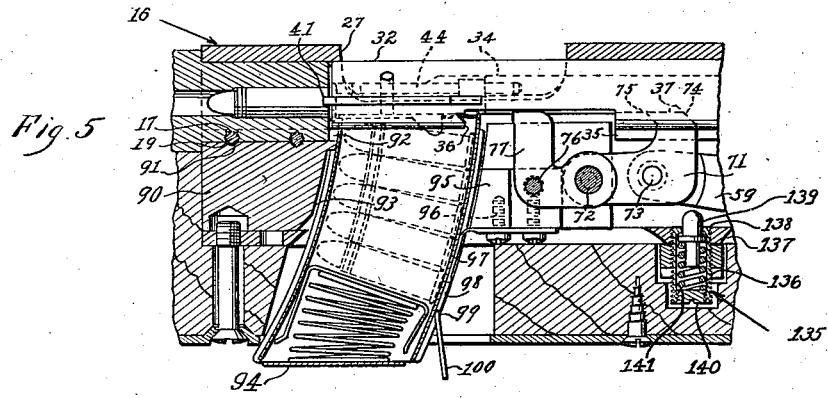
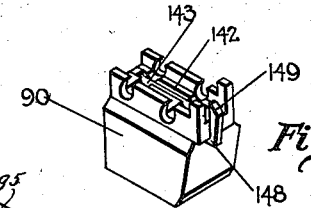
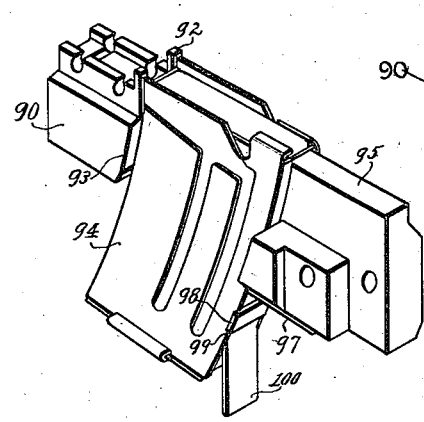
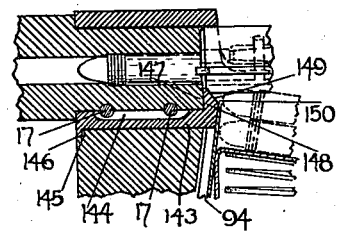
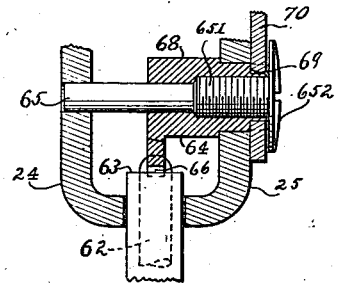

Aug. 22, 1944.  K. J. LOWE  2,356,257
FIREARM
Filed Nov. 28, 1939  4 Sheets-Sheet 3

INVENTOR.
Kenneth J. Lowe
BY
ATTORNEY

Aug. 22, 1944.　　　　　K. J. LOWE　　　　　2,356,257
FIREARM
Filed Nov. 28, 1939　　　　4 Sheets-Sheet 4
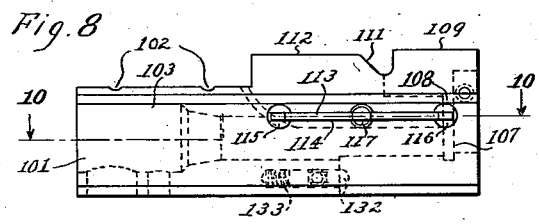
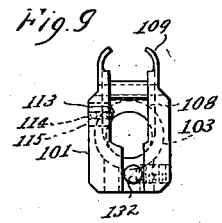
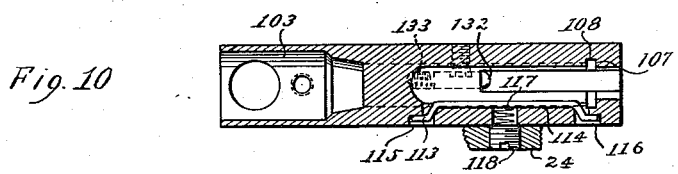
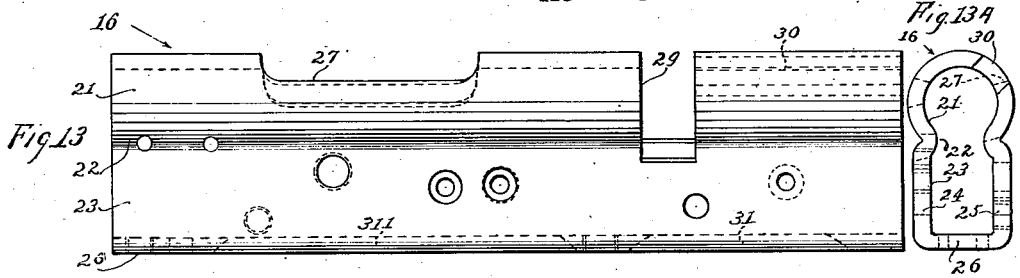
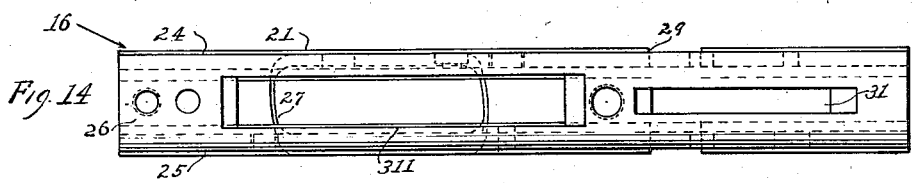
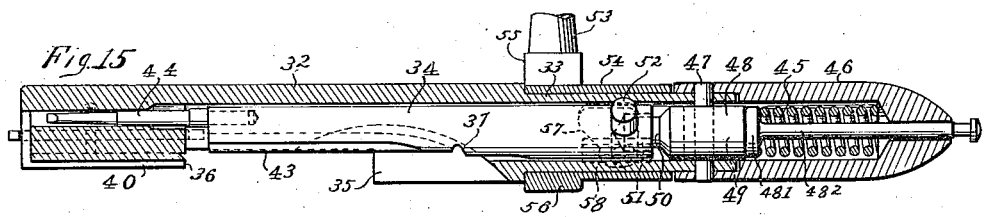
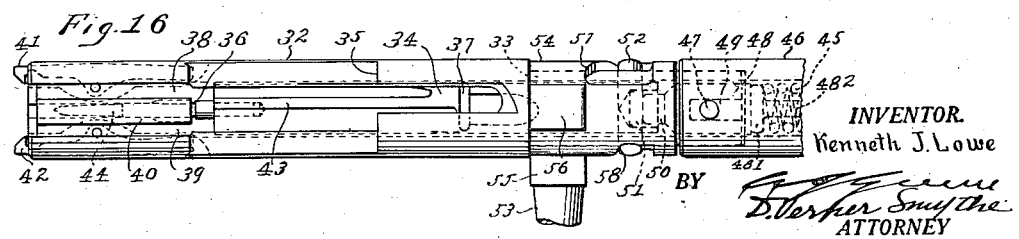
INVENTOR.
Kenneth J. Lowe
BY
ATTORNEY Patented Aug. 22, 1944

2,356,257

UNITED STATES PATENT OFFICE 2,356,257

FIREARM

Kenneth J. Lowe, Ilion, N. Y., assignor to Remington Arms Company, Inc., a corporation of Delaware Application November 28, 1939, Serial No. 306,457

5 Claims. (Cl. 42—17)

This invention relates to firearms, and contemplates numerous improvements in the construction and operation of receivers, breech closing mechanism, fire control mechanism and assemblies thereof.

It is one object of the invention to provide a complete assembly including a barrel, receiver, fire control devices, safety, shell ejector and assembled breech bolt, so constructed and related as to receive interchangeably a variety of different types of cartridge storing and feeding devices or a manual single cartridge feed; to the end that receivers, bolt assemblies, ejectors, triggers and sears may be manufactured in quantity and substantially completely assembled, and thereafter without material alteration be associated with a desired cartridge supporting storing and/or feeding device to form at will a complete single shot gun, a complete box magazine gun, or a complete tubular magazine gun.

The invention likewise contemplates cartridge supporting or supporting and feeding devices of the single shot, box magazine or tubular magazine type adapted for assembly with the universal mechanism.

The invention likewise contemplates the use of plastically formed metal tubing, that can be cheaply manufactured, for the receivers in place of machining receivers from solid blocks of metal.

The invention likewise contemplates improvements per se in receivers, bolts, bolt components, elements of fire control mechanism, and mechanism for performing the functions incident to reloading.

With these and other objects in view, the invention comprises novel constructions and combinations of parts, a representative embodiment of which is illustrated in the drawings and will be hereinafter more fully described.

In the drawings:

Fig. 1 is a side elevation, chiefly in section, of a portion of a firearm chassis, the bolt and fire control mechanism being adapted for use with no change whatever as a single shot gun or in conjunction with different types of cartridge handling devices. No parts are shown which are characteristic and essential to any one type of cartridge handling, the mechanism being entirely universal.

Fig. 2 is a horizontal section substantially on the line 2—2 of Fig. 1.

Fig. 3 is a fragmentary sectional side elevation corresponding to a portion of Fig. 1 and showing the completion of the universal mechanism into a single shot gun.

Fig. 4 is a detached perspective of a combined receiver closing filler block and cartridge receiving platform, this in conjunction with the bushing shown in Fig. 4A being all the parts added to the universal mechanism of Fig. 1 to complete therefrom a single shot gun.

Fig. 4A is a detached perspective of a bushing used in conjunction with the receiver of Fig. 3.

Fig. 5 is a fragmentary sectional side elevation showing the universal mechanism of Fig. 1 in conjunction with a box magazine.

Fig. 6 is a detached perspective of the parts utilized with the universal mechanism of Fig. 1 in the completion of a box magazine gun.

Fig. 8 is a side elevation of the combination receiver closing, magazine tube holding, cartridge feeding and assembly block utilizing in completing the universal mechanism of Fig. 1 into a tubular magazine gun.

Fig. 9 is a rear end view of the block shown in Fig. 8.

Fig. 10 is a horizontal section through the block, substantially on the line 10—10 of Fig. 8.

Fig. 13 is a side view of a universal receiver detached from the gun.

Fig. 13A is an end view of Fig. 13.

Fig. 14 is a bottom view of a universal receiver detached from the gun.

Fig. 15 is a substantially central longitudinal sectional elevation of the universal breech bolt.

Fig. 16 is a bottom view of the universal breech bolt.

Fig. 17 is a transverse sectional detail of the safety mechanism, substantially on the line 17—17 of Fig. 1.

Fig. 18 is a perspective view showing a filler block and a cartridge guide.

Fig. 19 is a fragmentary sectional view showing the cartridge guide in place.

Universal mechanism

Figure 7:
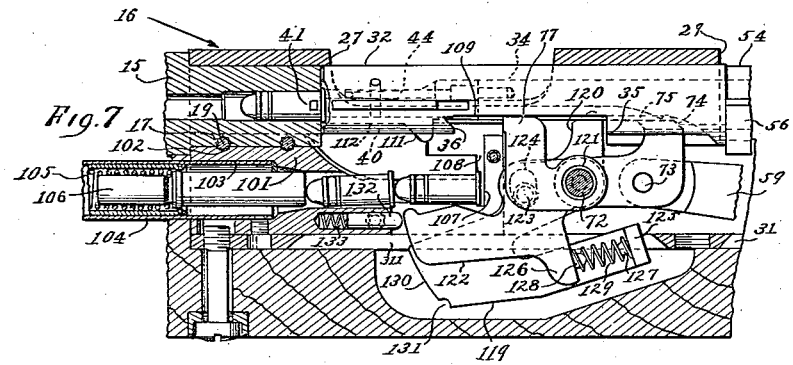
Fig. 7 is a fragmentary sectional side elevation showing the use of a tubular magazine with the universal mechanism of Fig. 1.

The universal mechanism illustrated in Figs. 1 and 2 comprises a barrel 15 secured to a receiver 16, the securing means preferably comprising transverse grooves 17 in the barrel and apertures 18 in the receiver, adapted to receive securing pins 19 which may be provided with a plurality of radial projections 20 which in assembly are forced in the peripheries of the grooves and apertures. Pins 19 likewise serve as retaining means for the receiver closing filler blocks distinctive to the different receiver models, as will hereinafter appear.

One example of a normal construction of the receiver is shown in Figs. 13, 13A and 14. It is of uniform wall thickness and uniform transverse dimensions throughout its length, consisting of a length of tube of proper cross section. The tubing may be of the seamless type made in any of the usual convention manners wherein the metal is mechanically or plastically shaped in a heated or cold condition by the use of suitable dies or other similar means. It is evident that the tubing may be made from a solid billet; or may be made from a flat piece rolled to shape, then welded in any of the usual manners, and then plastically formed to the desired contour. The weld in such a process usually loses its identity for all practical purposes, and the tube is in effect a true seamless tube. The upper portion may be of an arcuate or cylindrical configuration, both interiorly and exteriorly, the interior arc extending through about three-quarters of a circumference and providing a bolt receiving portion 21 which opens through a somewhat restricted throat 22 into a substantially rectilinear or rectangular fire control mechanism receiving portion 23, comprising side walls 24 and 25 and a bottom wall 26. It will be noted that the throat 22 is of less width both interiorly and exteriorly than the portion 23, the tubular stock of the receiver being indented to provide this constriction and to insure an adequate bearing for the cylindrical bolt which is housed in receiver part 21. The interior constriction, however, is not entirely necessary and may be omitted, provided there is sufficient bearing present to properly guide and hold the bolt. It is further apparent that the bolt receiving portion may be made of any desired shape to properly support and guide the bolt and similarly for the fire control receiving mechanism portion. Within the bolt receiving portion may be formed the shell ejection port 27, the transverse bolt handle hub and locking lug receiving slot 29, and longitudinal bolt handle hub slot 30. The bottom 26 of the receiver has a trigger slot 31 and a cartridge feeding mechanism slot 311, the latter being utilized in all but the single shot model.

The universal bolt comprises a main body portion 32 of generally cylindrical exterior configuration, having integral therewith a rearward extension 33 of reduced exterior diameter. The extension 33 and the major portion of the body 32 comprises a cylindrical bore of uniform diameter adapted to receive the body of a striker 34. The lower mid-portion of the body 32 is transversely cut away to give access to the striker, the transverse cut terminating at the rear in a shoulder 35 which functions in conjunction with the tubular magazine cartridge feed mechanism in a manner to be hereinafter described. Rearwardly the transverse cut communicates with a longitudinal slot which receives the sear for engagement with a sear notch 37 on striker 34. The lower forward portion of the bolt body comprises longitudinal slots 38 and 39, which are traversed by cartridge holding and ejecting devices to be described. Between slots 38 and 39 is a rib 40, the forward end of which forms a part of the cartridge head engaging bolt face and engages the head of a cartridge for the purpose of thrusting it into the barrel chamber. Rearwardly said rib terminates in a shoulder 36 which engages the sear to prevent removal of the bolt until the trigger is depressed, and performs other functions to be described. Extractors 41 and 42 are suitably mounted in opposite sides of the forward end of the bolt body 32. A spring (not shown) is interposed in a suitable aperture (not shown) in the bolt between the rearwardly extending portions of the extractors in a conventional manner.

The rearward portion of striker 34 is preferably cylindrical in shape, fitting within the bore of the bolt body 32. Forward from the sear notch 37, the lower portion of the striker body is cut away, leaving a body of substantially semi-cylindrical shape provided with a longitudinal rib 43 adapted to engage and hold the sear in depressed position during the travel of the bolt. Integral with or secured to the striker body is a firing pin 44 which occupies a suitable aperture in the forward portion of the bolt body 32, said aperture communicating with the larger bore occupied by the striker body.

The striker 34 is urged forward by striker spring 45 housed in a bolt cap 46 secured to the extension 33 of the bolt body by suitable means such as a pin 47 passing through aligned apertures in cap 46 and the extension 33. Interposed between striker spring 45 and the striker is a spring pilot 48 comprising a slot 49 which is traversed by the assembly pin 47 during the movement of the striker. Said pilot comprises a forward end 50 of reduced diameter which occupies a recess 51 in the rear end of the striker, its forward end bearing upon a striker cocking pin 52 and serving to retain said pin in place during movement of the bolt.

The bolt handle 53 is connected in a suitable manner with a cylindrical hub 54 which encircles the forward part of the bolt body extension 33. Intermediate the bolt handle and said hub is a squared shank 55, and integral with or secured to the hub 54 and suitably spaced from shank 55 is a supplemental locking lug 56. Parts 55 and 56 engage the rearward margins of the transverse receiver slot 29 to lock the bolt in its forward position. When the bolt is rotated to unlocked position shank 55 is aligned with the receiver slot 30 and lug 56 is aligned with the receiver throat 22, thereby permitting the necessary rearward movement of the bolt. The striker cocking pin 52 passes through oppositely disposed longitudinal slots in the bolt body extension 33, its end portions entering substantially triangular cocking apertures in the bolt handle hub 54. When the bolt handle is elevated to unlocked position, as heretofore described, the end portions of said pin are engaged by the inclined margins 57 of said apertures, thereby retracting the striker and compressing the striker spring 45. A dwell 58 at the end of each cam surface 57 serves to retain the striker in cocked position while the bolt is reciprocated or when it is removed from the receiver.

The universal fire control mechanism comprises a trigger 59 (Fig. 1) supported between the side walls 24 and 25 of the lower portion of the tubular receiver on a pivot pin 60. Said trigger is urged forwardly by a trigger spring 61 preferably housed in a well in the trigger, which well also receives part of a spring pilot 62 projecting upwardly from the upper surface 63 of the trigger. Said spring 61 through the spring pilot 62 likewise controls a safety member 64 mounted on a stud 65 supported between the receiver walls 24 and 25. Said safety comprises a foot 66 adapted in one position of rotation to overlie the trigger surface 63, thereby preventing movement of the trigger. It likewise comprises recesses 67 adapted to receive the rounded end of the spring pilot 62, thereby yieldingly retaining the safety in either effective or ineffective position. The laterally extending hub 68 of the safety is counterbored and threaded to receive an enlarged threaded section 651 (Figs. 2 and 17) of stud 65, which stud is also provided with a slotted head 652. The end portion of hub 68 is of reduced exterior diameter to enter the supporting aperture in receiver wall 25, and comprises opposed slots adapted to receive lugs 69 projecting inwardly from the hub of an upwardly extending finger piece 70 by which the safety is shifted between operative and inoperative position.

The sear 71 is supported on a pin 72 extending between the side walls 24 and 25 of the lower part of the receiver. Said pin likewise serves as a support for devices which vary according to the type of cartridge feed used, as will hereinafter appear. The sear projects rearwardly and upwardly from its support 72, being pivoted to the trigger 59 by a floating pivot 73 and comprising a nose 74 adapted for engagement with the sear notch 37 in the striker 34. The forward edge 75 of the upwardly extending portion of the sear is adapted to engage shoulder 36 on the bolt to stop rearward movement of the bolt, as heretofore described. Supported on the pin 72 and a screw 76 passing through the side of the receiver is a fixed ejector 77, the upper portion of which traverses the slot 38 in the forward end of the bolt and is projected therefrom to effect ejection of a fired shell as the bolt approaches the limit of its rearward movement.

In Fig. 5, an optional trigger cushioning device 135 is shown which will oppose the movement of the trigger after the sear has been released and give a cushioning action thereto. In order to remove the bolt, the trigger may be pressed so that the plunger 139 is depressed sufficiently to allow the bolt to be removed over the sear. An externally threaded hollow bushing 136 is screwed into a threaded opening 137 provided in the base of the receiver. The bushing is closed in at the top 138 to provide a guide and retaining means for the plunger 139. At the bottom of the bushing there is provided a screw plug closure member 140 to retain the spring 141 in place and allow adjustment thereof. When the trigger 59 is depressed in the normal operation to release the sear and fire the gun, the trigger will be stopped with a cushioning action upon contacting plunger 139. Then, when it is desired to remove the bolt, a further and harder pull on the trigger will move plunger 139 downward against spring 141, thus moving sear 71 from in front of the path of shoulder 36 of the bolt so that the bolt may be withdrawn rearwardly.

The parts thus far described are universal and can be made and substantially assembled in the described manner without reference to the type of cartridge feed mechanism employed. Cartridge feed may take a variety of forms. By way of example, the drawings illustrate three entirely different types: first, a single shot gun; second, a box magazine gun; and, third, a tubular magazine gun. The relatively few and simple parts which it is necessary to add to the universal mechanism to complete a gun of any of these types will now be described.

Single shot gun

Reference is made particularly to Figs. 3 and 4. To complete the single shot gun it is necessary merely to add to the universal mechanism a filler block, separately illustrated in Fig. 4 and identified by numeral 80, which block serves the purpose of closing the forward end of the receiver and furnishing a cartridge supporting table. The upper portion of the cartridge supporting filler block 80 comprises lateral ribs 81 and 82 which prevent rotation of the bolt and define a trough in which a cartridge dropped into the receiver through the opening 27 is guided into the chamber in the forward movement of the breech bolt. The block 80 is held in place by the barrel and receiver assembly pins 19, its upper forward surface lying adjacent the underside of the barrel and being provided with grooves matching the barrel grooves 17 to receive said assembly pins. It will be remembered that the pin 72, which passes between the two opposite walls 24 and 25 of the lower portion of the receiver, supports only the sear 71 and the ejector 77; hence, in this model a bushing 83 surrounds the remainder of the length of the pin to prevent undesirable lateral displacement of the sear. This completes the single shot arm.

Box magazine repeater

The parts peculiar to this model are shown in Figs. 5 and 6. A filler block 90 closes the forward end of the receiver and is held in place by the assembly pins 19, the lower intermediate portions of which occupy grooves 91 in the filler block 90 matching with the grooves 17 in the barrel. The upper rear portion of the filler block is provided with upstanding lugs 92, the ends of which provide surfaces which prevent the rotation of the bolt during the cocking of the striker. The rear face 93 of the filler block is forwardly and downwardly inclined to provide a guide surface for the forward edge of a box magazine 94, from which cartridges are delivered one at a time for insertion in the barrel chamber in the same manner in which they are delivered from the tubular magazine feed box, to be described. The pin 72 and screw 76 support a filler block 95, the forward face of which is inclined to form a rear guide for said box magazine. To the lower face of filler block 95 is secured by suitable means, such as screws 96, a spring piece 97 which projects forwardly and downwardly along the rear edge of the box magazine and is provided with ears 98 adapted to engage notches 99 in the rear margins of the side walls of the box magazine, thereby retaining it in place. The magazine is released for removal by rearward pressure upon the depending portion of the spring which forms a finger piece 100. The stock is, of course, vertically apertured to receive the lower portion of the box magazine. Thus by the addition of three parts, namely, filler block 90, filler block and spring support 95 and the spring piece 97, the universal mechanism is completed into a box magazine gun.

Tubular magazine gun

Figure 11:
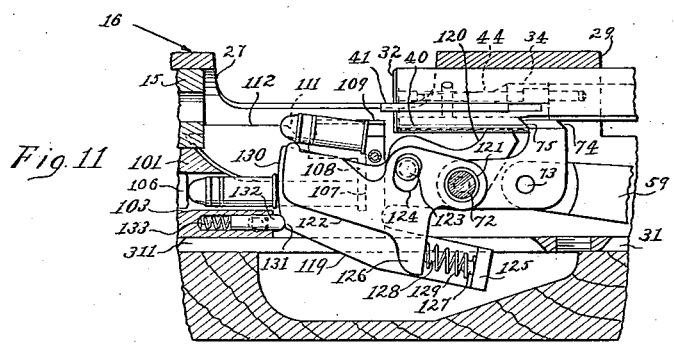
Fig. 11 is a longitudinal sectional elevation similar to Fig. 7, but with the breech bolt retracted.
Figure 12:
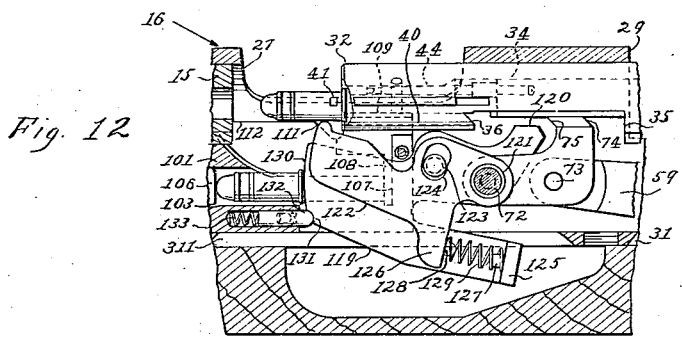
Fig. 12 is a longitudinal sectional elevation similar to Fig. 11 showing the cartridge being thrust upwardly and forwardly toward the chamber and under the extractors during the advance of the breech bolt.

The parts which are individual to the tubular magazine gun are shown in Figs. 7 to 12, inclusive. The lower forward portion of the receiver is occupied by a filler and cartridge feed block 101 separately shown in Figs. 8 and 9. This block is of substantial length as compared with the filler blocks utilized in the single shot and box magazine models. It is held in place in the same manner, namely, by receiver and barrel assembly pins 19, the lower portions of which occupy grooves 102 matching the grooves 17 in the barrel. The block comprises a longitudinal bore 103 adapted to receive the end portion of a tubular magazine 104, the forward end of which is supported below the barrel in the usual manner. The tubular magazine contains the usual spring 105 and spring follower 106 by which the column of cartridges therein is thrust rearwardly. Aligned with the bore 103 of the feed block is a bore of a diameter suitable to receive the cartridges as delivered one at a time from the tubular magazine, the rearmost cartridge coming to rest against shoulders 107 at the end of said bore. The rear end of the feed block comprises a vertical slot through which operate the cartridge feeding devices to be described. The block is likewise slotted vertically above the aforementioned cartridge receiving bore to permit the passage of the body of a cartridge, and the walls bounding said block comprise vertical recesses 108 traversed by the rim of the cartridge in its upward movement.

At the upper rear end of the block are inturned cartridge retainers 109 spaced by a distance which does not permit the passage of the body of a cartridge but does permit the passage of the cartridge feeding rib 40 on the bolt, the inturned retainers 109 traversing the grooves 38 and 39. Forward from the retainers 109 are notches bounded by the forwardly and upwardly inclined rear ends 111 of ribs 112, said ribs being spaced by a distance which permits the passage of the body of a cartridge but not the rim thereof. It will be apparent that as a cartridge is thrust forward from under the retainers 109 by the breech bolt rib 40 the rim thereof rides up the inclines 111 and along the flat upper margins of rib 112 as said cartridge is moved toward the chamber by the breech bolt rib.

The cartridge in the bottom of the feed block in alignment with the tubular magazine is yieldingly retained against upward movement from this position by a suitable yieldable retainer; the form of retainer which has been illustrated (Fig. 10) comprises a stiff wire 113 lying in a longitudinal slot 114 in one of the side walls of the feed block. The end portion of this wire are offset and laterally engage the bottoms of recesses 115 and 116 communicating with said slot 114. The mid-portion of the wire is engaged by a spring 117 which is compressed by a screw 118 held in the side of the receiver. Thus, the cartridge in the bottom of the feed block cannot be accidentally displaced upwardly, but a positive pressure thereon will compress the spring and permit its upward movement, its rim traversing the aforementioed vertical slots 108 in the interior side walls of the feed block. Other similar and equivalent forms of a yieldable retainer may be employed if desired.

To move a cartridge from its position in the bottom of the feed block to a position immediately beneath the retainers 109 at the proper time, that is when the breech bolt has been fully retracted, suitable means are provided, one form of which is described as follows: Upon the pin 72 is pivoted an actuator or elevator 119 provided with an upstanding arm 120 adapted for engagement upon its forward edge with the breech bolt shoulder 36, said forward edge being inclined to permit the breech bolt to move thereover (Fig. 11) after the actuator has been rocked the desired amount by such engagement. The rearward edge of arm 120 is engaged by the breech bolt shoulder 35 to restore the actuator to normal position as the breech bolt approaches its forward position. Adjacent the pin 72 the actuator is provided with a hub 121 upon which is pivoted a cartridge feed lever or cartridge lifter 122. Movement of the cartridge feed lever with respect to the actuator is limited by a stud or stop abutment 123 projecting from the actuator into a slot 124 in the feed lever. The feed lever is urged upwardly with respect to the actuator by means of a spring or yieldable means 129 compressed between a laterally and forwardly turned ear 125 on the actuator and a foot 126 on the feed lever. Preferably, spring retaining pilots 127 and 128 are formed integral with the ear 125 and the foot 126 for retaining the spring 129 in place. The actuator 119 comprises an arcuate forward face 130 adapted to engage the head of the rearmost cartridge in place throughout the displacement of the actuator from its normal position. In the lower portion of the face 130 is an arcuate recess 131 adapted, when the actuator is in its uppermost position, to receive the rounded end of a pin 132 partially housed in a recess in the feed block and urged rearwardly by a spring 133. The engagement of pin 132 in the recess 131 serves to yieldingly retain the actuator in its uppermost (operated) position during the forward movement of the breech bolt after the bolt rib 40 has moved out of contact with the arm 120.

The operation of the cartridge feed mechanism may be described as follows: When the tubular magazine is loaded and the breech closed, the mechanism is in the condition illustrated in Fig. 7. A cartridge lies in the bottom of the feed block, being thrust against the shoulders 107 by the pressure of the column of cartridges in the tubular magazine, the cartridges being urged rearwardly by the magazine spring. The cartridge in the bottom of the feed block is yieldingly retained against upward displacement by the retainer wire 113. The actuator and cartridge feed lever are in their lowermost positions, their upper surfaces being beneath the cartridge. If the breech bolt is now unlocked and retracted, during its rearward movement, shoulder 36 engages and passes over the arm 120, rocking the actuator counterclockwise and elevating the portion thereof in front of pivot 72. The cartridge in the feed block which overlies the actuator and cartridge feed lever is engaged by the upper surface of said feed lever and, as the actuator is moved, the spring 129 is compressed and energy stored therein until sufficient force is exerted upon the cartridge to cause the retainer to yield, thereby allowing the cartridge to be moved upwardly towards the inturned retainers 109. This happens before the movement of the actuator is completed, and since further movement of the cartridge is stopped by the retainers the cartridge feed lever spring 129 may again be compressed; the parts assuming the position illustrated in Fig. 11. The movement of the actuator has brought the recess 131 into alignment with the pin 132 which is engaged therein to retain the actuator during forward movement of the breech bolt. As the breech bolt completes its rearward movement, its face passes to the rear of the ejector 77 and the fired shell which has been extracted from the chamber is ejected. Immediately thereafter rearward movement of the breech bolt is stopped by the engagement of the forward edge 75 of the sear 71 with shoulder 36. As the breech bolt moves forward, the face of breech bolt rib engages the head of the cartridge held in the top of the feed block and thrusts this cartridge forwardly out from under the inturned retainers 103. As it passes from the retainers, said cartridge is free to move upwardly and is so moved by the cartridge feed lever under the compression of the spring 129. This movement insures the proper engagement of the rim of the cartridge under the claws of the extractors 41 and 42. The rim of the cartridge thereafter moves upwardly along the inclined rear edges 111 of the ribs 112 and is carried into the chamber. As the breech bolt approaches its forward position, the rear face of arm 120 of the actuator is engaged by shoulder 35 on the breech bolt, and the actuator and cartridge feed lever are restored to their normal (Fig. 7) position. As the actuator passes below the rearmost cartridge in the magazine, this cartridge is moved to the rear by the magazine spring, leaving the parts again in the condition shown in Fig. 7.

*Cartridge guide*

In Figs. 18 and 19 there is shown a modification applicable particularly to the box magazine form of the firearm, although it is to be understood that it may be applied to this or other forms. There is seen in Figs. 18 and 19 a slot 142 which may be cut into the filler block 90 in any suitable manner. A cartridge guide 143 is provided which may take the contour of the form shown and which is carried in the slot 142. A portion may be cut away, as at 144, so as to clear the retaining pins 17. A shoulder 145 cut in the filler block cooperates with the shoulder 146 of the cartridge guide, and shoulder 147 of the barrel cooperates with projection 148, to suitably hold and locate the cartridge guide in position in the slot 142. The upstanding portion 148 has an inclined surface 149, to guide the cartridges into the chamber. The box magazine 94 preferably has a circular cut in the forward wall, as at 150, which registers with the inclined surface 149 so that the cartridges, as they are carried forward and into position, will have the nose of the projectile thereof guided upwardly and into position so that the bolt will properly push the cartridge into the chamber. This feature is particularly desirable when short cartridges are used instead of full length cartridges.

From the foregoing description, it is apparent that by this invention it is possible to materially reduce the cost of manufacture of firearms, particularly where a firearm is to be optionally made with various types of feeding and loading means and wherein many of the parts are identical and may be standardized. The invention has also made it possible to materially reduce the time required and the cost of making firearm receivers which hitherto has necessitated expensive machining from solid blocks of metal.

The invention is not considered as limited to the specific construction shown and described by way of illustration, since it extends to all equivalent constructions falling within the scope of the appended claims, which claims are to be broadly construed.

What is claimed is:

1. A firearm assembly comprising a chambered barrel, a unitary tubular receiver secured to said barrel and comprising an upper arcuate bolt receiving portion and an integral communicating depending portion, a bolt housed in said arcuate portion and adapted to engage and move cartridges one at a time into said chamber, a fire control mechanism supported and partially housed in the rear part of said depending portion and cooperating with said bolt, said depending portion of said tubular receiver being open at its forward end, the lower wall of said forward end serving as a bridge portion, said lower wall having an opening rearward of said bridge, said forward depending portion and barrel being constructed and arranged to selectively receive and support in permanently integrated operative relationship to the other parts of said assembly any one only of a plurality of differently constructed and functioning cartridge feeding devices.

2. A firearm assembly comprising a chambered barrel, a unitary tubular receiver secured to said barrel and comprising an upper arcuate bolt receiving portion and an integral communicating depending portion, a bolt housed in said arcuate portion and adapted to engage and move cartridges one at a time into said chamber, a fire control mechanism supported and partially housed in the rear part of said depending portion and cooperating with said bolt, said depending portion of said tubular receiver being open at its forward end, the lower wall of said forward end serving as a bridge portion, said lower wall having an opening rearward of said bridge, said forward depending portion and barrel being constructed and arranged to selectively receive and support in permanently integrated operative relationship to the other parts of said assembly any one only of a plurality of cartridge feeding devices, one such device comprising a box magazine substantially housed in said receiver and another such device comprising a feed box and cartridge lifting devices associated with a tubular magazine.

3. A firearm assembly comprising a chambered barrel, a unitary tubular receiver secured to said barrel and comprising an upper arcuate bolt receiving portion and an integral communicating depending portion, a bolt housed in said arcuate portion and adapted to engage and move cartridges one at a time into said chamber, a fire control mechanism supported and partially housed in the rear part of said depending portion and cooperating with said bolt, said depending portion of said tubular receiver being open at its forward end, the lower wall of said forward end serving as a bridge portion, said lower wall having an opening rearward of said bridge, said forward depending portion and barrel being constructed and arranged to selectively receive and support in permanently integrated operative relationship to the other parts of said assembly any one only of a group of differently constructed and functioning cartridge feeding devices, one such device comprising a closing filler block providing a support for a single cartridge adjacent said chamber, a second device comprising filler and spacer blocks defining a channel for holding a box magazine substantially housed within said receiver, and a third device comprising a feed box and cartridge lifting devices associated with a tubular magazine.

4. A firearm assembly comprising a chambered barrel, a unitary tubular receiver secured to said barrel by means including pins traversing said receiver, said tubular receiver comprising an upper arcuate bolt receiving portion and an integral communicating depending portion, a bolt housed in said arcuate portion and adapted to engage and move cartridges one at a time into said chamber, a fire control mechanism supported and partially housed in the rear part of said depending portion and cooperating with said bolt, said depending portion of said tubular receiver being open at its forward end, the lower wall of said forward end serving as a bridge portion, said lower wall having an opening rearward of said bridge, said forward depending portion, pins, and barrel being constructed and arranged to selectively receive and support in permanently integrated operative relationship to the other parts of said assembly any one only of a plurality of differently constructed and functioning cartridge feeding devices.

5. A firearm assembly comprising a chambered barrel, a unitary tubular receiver secured to said barrel and comprising an upper arcuate bolt receiving portion and an integral communicating depending portion, said arcuate portion and depending portion being joined by a transversely narrowed throat, a bolt housed in said arcuate portion and adapted to engage and move cartridges one at a time into said chamber, a fire control mechanism supported and partially housed in the rear part of said depending portion and cooperating with said bolt, said depending portion of said tubular receiver being open at its forward end, the lower wall of said forward end serving as a bridge portion, said lower wall having an opening rearward of said bridge, said forward depending portion and barrel being constructed and arranged to selectively receive and support in permanently integrated operative relationship to the other parts of said assembly any one only of a plurality of differently constructed and functioning cartridge feeding devices.

KENNETH J. LOWE.